US008811194B2

(12) United States Patent
Olgaard et al.

(10) Patent No.: US 8,811,194 B2
(45) Date of Patent: Aug. 19, 2014

(54) METHOD FOR TESTING WIRELESS DEVICES USING PREDEFINED TEST SEGMENTS INITIATED BY OVER-THE-AIR SIGNAL CHARACTERISTICS

(75) Inventors: Christian Volf Olgaard, Saratoga, CA (US); Ruizu Wang, San Ramon, CA (US)

(73) Assignee: Litepoint Corporation, Sunnyvale, CA (US)

( * ) Notice: Subject to any disclaimer, the term of this patent is extended or adjusted under 35 U.S.C. 154(b) by 496 days.

(21) Appl. No.: 12/873,399

(22) Filed: Sep. 1, 2010

(65) Prior Publication Data

US 2012/0051224 A1    Mar. 1, 2012

(51) Int. Cl.
*H04L 1/00* (2006.01)
*H04L 12/26* (2006.01)

(52) U.S. Cl.
CPC ............ *H04L 12/2697* (2013.01); *H04L 43/50* (2013.01)
USPC .......................................... 370/249; 714/742

(58) Field of Classification Search
None
See application file for complete search history.

(56) References Cited

U.S. PATENT DOCUMENTS

| | | | |
|---|---|---|---|
| 4,833,676 A | 5/1989 | Koo | |
| 4,897,842 A | 1/1990 | Herz | |
| 5,138,608 A | 8/1992 | Kucera et al. | |
| 5,477,531 A * | 12/1995 | McKee et al. | 370/249 |
| 5,910,977 A | 6/1999 | Torregrossa | |
| 6,753,693 B2 | 6/2004 | Seo et al. | |
| 6,870,392 B2 | 3/2005 | Kilian et al. | |
| 6,986,086 B2 | 1/2006 | Scholten | |
| 7,057,518 B2 | 6/2006 | Schmidt | |
| 7,155,653 B2 * | 12/2006 | Monnerat | 714/742 |
| 7,181,360 B1 * | 2/2007 | Nikolac et al. | 702/119 |
| 7,260,645 B2 * | 8/2007 | Bays | 709/238 |
| 7,463,140 B2 | 12/2008 | Schmidt | |
| 7,489,641 B2 * | 2/2009 | Miller et al. | 370/241.1 |
| 7,500,158 B1 * | 3/2009 | Smith et al. | 714/708 |
| 7,564,893 B2 | 7/2009 | O'Neill | |
| 7,689,213 B2 | 3/2010 | Olgaard et al. | |
| 7,890,822 B2 | 2/2011 | Behziz et al. | |
| 7,962,806 B2 * | 6/2011 | Kotrla et al. | 714/704 |
| 8,000,656 B1 * | 8/2011 | Jiao et al. | 455/67.11 |
| 8,140,920 B2 * | 3/2012 | Kotrla et al. | 714/712 |
| 2004/0019659 A1 * | 1/2004 | Sadot et al. | 709/219 |
| 2004/0030977 A1 | 2/2004 | Jiang et al. | |
| 2004/0095893 A1 * | 5/2004 | Goringe et al. | 370/252 |
| 2006/0154610 A1 * | 7/2006 | Rumney | 455/67.14 |
| 2006/0258286 A1 | 11/2006 | Qi | |
| 2007/0271360 A1 | 11/2007 | Sahita | |
| 2008/0137543 A1 * | 6/2008 | Mitra | 370/242 |
| 2008/0285467 A1 * | 11/2008 | Olgaard | 370/242 |
| 2009/0303885 A1 * | 12/2009 | Longo | 370/242 |
| 2013/0242781 A1 * | 9/2013 | Hui et al. | 370/252 |

OTHER PUBLICATIONS

International Search Report and Written Opinion for PCT/US2011/047184, mailed Feb. 24, 2012; 9 pages.

* cited by examiner

*Primary Examiner* — Brian D Nguyen
*Assistant Examiner* — Roberta A Shand
(74) *Attorney, Agent, or Firm* — Vedder Price, P.C.

(57) ABSTRACT

A method for testing a packet data signal transceiver via its packet data signal interface. The packet data signal interface is used to convey test packet data signals from the test equipment to the DUT, and response packet data signals responsive to such test packet data signals from the DUT to the test equipment.

22 Claims, 3 Drawing Sheets

METHOD FOR TESTING WIRELESS DEVICES USING PREDEFINED TEST SEGMENTS INITIATED BY OVER-THE-AIR SIGNAL CHARACTERISTICS

BACKGROUND OF THE INVENTION

1. Field of the Invention

The present invention relates to systems and methods for testing wireless devices using test platforms consisting of hardware, firmware and software components.

2. Related Art

Many modern devices utilize wireless signals to send and receive data. Handheld devices in particular make use of wireless connections to provide features including telephony, digital data transfer, and geographical positioning. Although a variety of different wireless-connectivity capabilities are used (such as WiFi, WiMAX, and Bluetooth), in general each is defined by an industry-approved standard (such as IEEE 802.11, IEEE 802.16 and IEEE 802.15, respectively). In order to communicate using these wireless-connectivity capabilities, devices must adhere to the parameters and limitations specified by the associated standards.

Although differences exist between wireless communication specifications (for example, in the frequency spectra, modulation methods, and spectral power densities used to send and receive signals), almost all of the wireless connectivity standards specify the use of synchronized data packets to transmit and receive data. Furthermore, most devices adhering to these wireless communications standards employ transceivers to communicate; that is, they transmit and receive wireless radio frequency (RF) signals.

At any point along the device-development continuum, it may be necessary to test and verify that a device is operating according to the standards associated with its various communication capabilities. Specialized systems designed for testing such devices typically contain subsystems operative to communicate with a wireless communications device during a test. These subsystems are designed to test that a device is both sending and receiving signals in accordance with the appropriate standards. The subsystems must receive and analyze device-transmitted signals and send signals to the device that subscribe to industry-approved standards.

The testing environment generally consists of the device under test (DUT), the tester, and a computer. The tester is generally responsible for communicating with the DUT using a particular wireless communication standard. The computer and tester work together to capture a DUT's transmitted signals and then analyze them against the specifications provided by the underlying standard to test the DUT's transmission capabilities.

As is well known in the art, the time required to test a device has a linear relationship with the cost associated with conducting the test. Therefore, it is advantageous to reduce the amount of time required by a test, thereby increasing the throughput of each test system and lowering overall production costs. Several factors contribute to the total time required to test a device. These factors include the time spent handling a device, setting up the test, sending control signals from the tester to the device, capturing signals sent by the device, and analyzing those captured signals. Time spent sending control signals to the device can make up a proportionately large contributor to the overall test time. Furthermore, these control signals are not directly involved in capturing, measuring, or evaluating signals from the device. As such, this is a ripe area for innovation.

Despite the advantages gained by reducing overall test time, the accuracy and validity of a test cannot be compromised. At a minimum, doing so would increase the rate of retesting necessary to evaluate a device, causing a proportionate rise in the total time required for testing. As such, methods for decreasing the time required to perform a test without eliminating necessary steps or compromising the integrity of the test are desired.

SUMMARY OF THE INVENTION

A method is provided for testing a packet data signal transceiver via its packet data signal interface. The packet data signal interface is used to convey test packet data signals from the test equipment to the DUT, and response packet data signals responsive to such test packet data signals from the DUT to the test equipment.

In accordance with one embodiment of the presently claimed invention, a method of testing a packet data signal transceiver via its packet data signal interface includes:

establishing a packet data signal communication channel between a packet data signal tester and a packet data signal transceiver for conveying a plurality of packet data signals between the packet data signal tester and packet data signal transceiver;

transmitting, with the packet data signal tester via the packet data signal communication channel, one or more test packet data signals; and receiving, with the packet data signal tester from the packet data signal transceiver via the packet data signal communication channel, one or more response packet data signals responsive to the one or more test packet data signals.

In accordance with another embodiment of the presently claimed invention, a method of testing a packet data signal transceiver via its packet data signal interface includes:

establishing a packet data signal communication channel between a packet data signal tester and a packet data signal transceiver for conveying a plurality of packet data signals between the packet data signal tester and packet data signal transceiver;

receiving, with the packet data signal transceiver from the packet data signal tester via the packet data signal communication channel, one or more test packet data signals; and transmitting, responsive to the one or more test packet data signals, with the packet data signal transceiver via the packet data signal communication channel, one or more response packet data signals.

DETAILED DESCRIPTION

Figure 1:
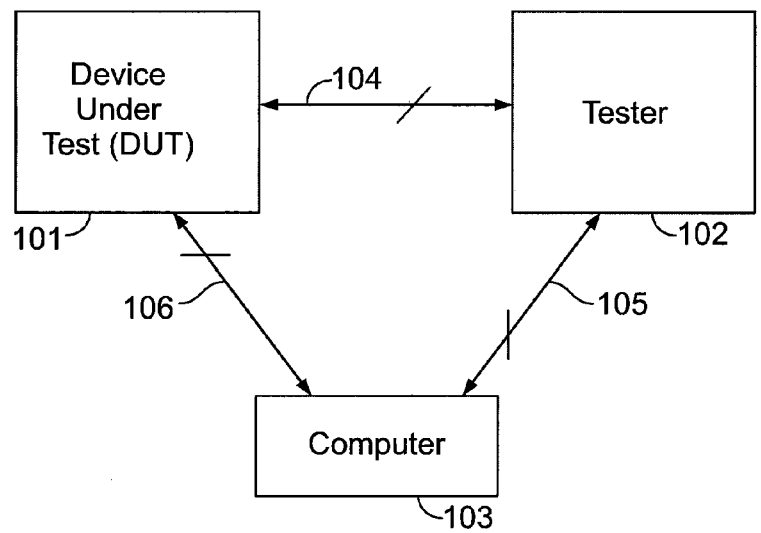
FIG. 1 is a functional block diagram of a conventional system for testing a wireless data communication system.

The following detailed description is of example embodiments of the presently claimed invention with references to the accompanying drawings. Such description is intended to be illustrative and not limiting with respect to the scope of the present invention. Such embodiments are described in sufficient detail to enable one of ordinary skill in the art to practice the subject invention, and it will be understood that other embodiments may be practiced with some variations without departing from the spirit or scope of the subject invention.

Throughout the present disclosure, absent a clear indication to the contrary from the context, it will be understood that individual circuit elements as described may be singular or plural in number. For example, the terms "circuit" and "circuitry" may include either a single component or a plurality of components which are either active and/or passive and are connected or otherwise coupled together (e.g., as one or more integrated circuit chips) to provide the described function. Additionally, the term "signal" may refer to one or more currents, one or more voltages, or a data signal. Within a drawing, like or related elements will have like or related alpha, numeric or alphanumeric designators. Further, while the present invention has been discussed in the context of implementations using discrete electronic circuitry (preferably in the form of one or more integrated circuit chips), the functions of any part of such circuitry may alternatively be implemented using one or more appropriately programmed processors, depending upon the signal frequencies or data rates to be processed.

In accordance with the presently claimed invention, one or more methods are provided for testing a packet data signal transceiver as a wireless device under test (DUT) such that the DUT responds to instructions in the form of test packet data signals from external test equipment in the form of packet data signal test equipment, often referred to as a tester, while minimizing the number of communications between the DUT and the test system controller (e.g., computer). The wireless signal interface between the DUT and the tester is used to convey test instructions and other signals from the tester to the DUT and relay acknowledgments or other responsive signals from the DUT back to the tester. The signal connection using the wireless signal interface between the DUT and the tester can be a wired connection (e.g., a cable) or an over-the-air (wireless) connection. Standard data packets are transmitted by the tester to the DUT and are recognized by the DUT using pre-installed firmware. In a preferred embodiment, the signal sent by the tester includes a data packet with particular signal characteristics (data rate, data channel frequency, signal modulation type, signal power level, data packet length, or any other suitable signal characteristics), which are recognized by the DUT, e.g., as indices within a look-up table (LUT) and indicative of corresponding predetermined responsive signals to be sent back to the tester. This advantageously avoids the need to transfer equivalent commands via a control interface between the DUT and test system controller.

Referring to FIG. 1, a conventional test system for evaluating a wireless device includes the device under test (DUT) 101, a tester 102 (e.g., including a vector signal generator (VSG) and a vector signal analyzer (VSA)), and a control computer (PC) 103 linked by interfaces 104, 105, 106 which can constitute any form of communications link (e.g., Ethernet, universal serial bus (USB), serial peripheral interface (SPI), wireless interfaces, etc.). These interfaces 104, 105, 106 may be composed of one or more data channels. For example, interface 104 could be a multiple input, multiple output (MIMO) type link (e.g., as in the IEEE 802.11n wireless standard) or a single input, single output (SISO) type link (e.g., as in the IEEE 802.11a wireless standard). Other possible communications links will be clear to one of ordinary skill in the art. In such a system, the tester 102 sends test signals to the DUT 101 over a bidirectional interface 104. The DUT 101 will also transmit signals to the tester 102 using the same bidirectional interface 104. The control computer 103 executes a test program and coordinates the operation of the DUT 101 and tester 102 via interfaces 105 and 106. In other words, all test control and coordination is done via the controller-tester interface 105 and controller-DUT interface 106, with all communications via the tester-DUT interface 104 being responsive to such test control and coordination.

In a typical transmitter test scenario, the control computer 103 sends commands to both the DUT 101 and tester 102. For example, the control computer 103 will instruct the DUT 101 to transmit a particular number of packets to the tester 102 or to count the number of packets received from the tester 103. All of the commands necessary for the DUT 101 to participate in the evaluation process necessarily originate from the control computer 103. This requires that the DUT 101 be configured to receive instructions from the control computer 103 using a separate interface 106 from the interface 104 being tested. Furthermore, an additional layer of software is required to interpret the instructions received from the control computer 103, raising the computational demands on the DUT 101. As a result, both setup and execution time for the test are increased.

Figure 2:
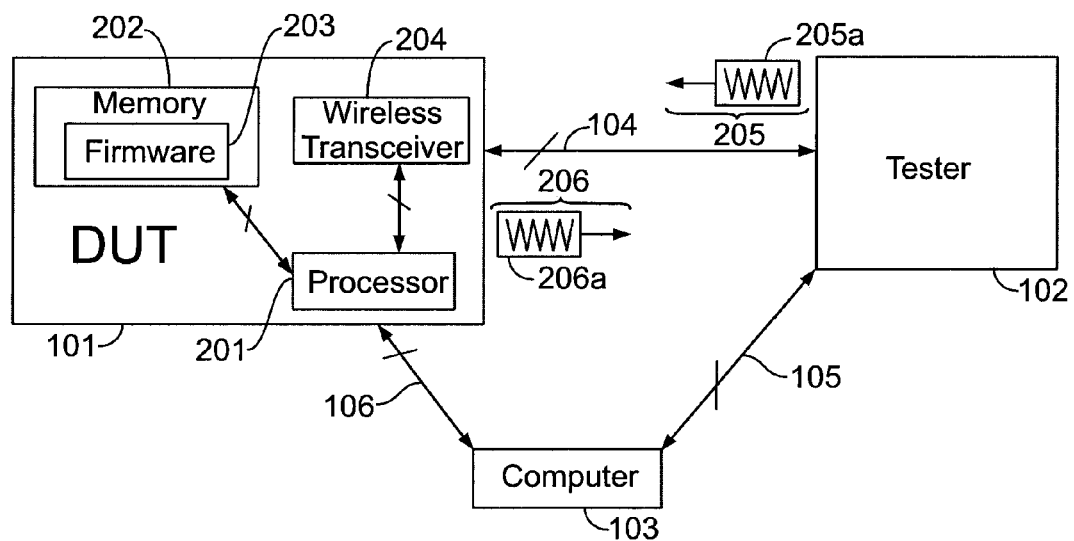
FIG. 2 is a functional block diagram depicting a system for testing a packet data signal transceiver in accordance with one embodiment of the presently claimed invention whereby the device under test (DUT) contains a processor running test firmware and is responsive to data packets sent by a tester.

Referring to FIG. 2, an embodiment of the present invention is shown. As in FIG. 1, the test system includes the DUT 101, the tester 102, and the control computer 103 all linked by bidirectional communications pathways 104, 105, 106. It should be understood that while the communication path 106 between the control computer 103 and DUT 101 is shown as included, this is optional for purposes of testing of the DUT. In other words, as discussed in more detail below, an advantage of the presently claimed invention is that such communication path 106 is unnecessary for testing the DUT, although it may be used for other purposes. For example, it may be used for updating or programming contents of memory 202 within the DUT (discussed in more detail below).

The DUT 101 contains a processor 201 and associated memory 202 including firmware 203 prior to the start of the test. The processor 201 is operative to control the DUT 101 in accordance with the firmware 203. The firmware 203 acts in response to signals received through interface 104 from the tester 102. By way of example but not limitation, the processor 201 could be an embedded host processor with associated memory 202 running firmware 203 and operative to control an embedded wireless transceiver 204 within the DUT 101. In one example, the firmware 203 can be loaded into the memory 202 through the interface 106 between the DUT 101 and the control computer 103. In this way, the firmware 203 required to conduct a test can be loaded immediately before testing and replaced with the original firmware when testing is concluded. The firmware 203 could also be loaded when the DUT 101 is initially manufactured or at any other point prior to testing. Optionally, the firmware 203 necessary to conduct the test can be left installed after testing is completed in order to allow a device to be easily tested again at a later time. In such an example, a portion of the standard firmware used to operate a device could contain the instructions necessary to enable the device to undergo testing. These instructions could constitute a test mode. A DUT 101 could enter a test mode, for example, by receiving a command from the control computer 103 (e.g., if the communication path 106 between the control computer 103 and DUT 101 is provided), by receiving a command from the tester 102 (e.g., via the wireless communications link 104), or via the activation of a hardware switch on the DUT 101 itself. Alternatively, the DUT 101 can be hard-wired or programmed to boot up into a test mode following a power up sequence. Other methods of putting a DUT 101 into test mode will be clear to those of ordinary skill in the art.

Returning to FIG. 2, the test interface 104 specifically connects the tester 102 and a wireless transceiver 204 within the DUT 101. As such, this interface 104 adheres to the protocols set by a particular wireless standard (e.g., IEEE 802.11). As is known in the art, this interface 104 could be made using either a wired (physical) or wireless (over-the-air) connection between the wireless transceiver 204 and the tester 102. While the time needed to enable and initiate signal communications would generally be expected to be similar for both wireless and wired connections, in the preferred embodiment, a wireless connection is often used as less setup time is required than for a wired connection due to less mechanical handling being required, e.g., connecting appropriate signal cabling. However, in some cases (such as when testing in environments where significant amounts of wireless interference are present), a wired connection may be preferred.

Before testing can begin, the DUT 101 and the tester 102 must synchronize as part of establishing a packet data signal communications channel over the test interface 104. As is known to one of ordinary skill in the art, this process differs between communications specifications and is explicitly defined within each specification. The specific process used will depend on the wireless standard being tested (and thereby being used for the test interface 104). For example, synchronization might comprise the DUT 101 and tester 102 selecting a frequency or channel over which to communicate and exchanging predetermined, e.g., defined by the applicable communications standard, synchronization data packets. Once synchronization is complete, testing can begin. (It will be appreciated that, for test mode purposes, a streamlined synchronization process can be used, e.g., a process to simply ensure necessary timing synchronization between the DUT 101 and tester 102, as opposed to the normal protocol-based synchronization process defined by the wireless standard being tested, which can be slower due to additional synchronization requirements for normal full-featured communications.)

In the present example, the test begins when an over-the-air test signal 205 is sent from the tester 102 to the DUT 101. (It should be understood that such over-the-air test signal 205 is preferably conveyed wirelessly, although such signal 205 may also be conveyed via a wired signal path 104.) The signal 205 is comprised of a single data packet 205a. This data packet 205a adheres to the requirements outlined in the wireless specification being tested (e.g., IEEE 802.11). The processor 201 within the DUT 101 is operative to interpret the data packet 205a as an instruction according to information contained within associated firmware 203. The processor 201 then controls the DUT 101, causing the DUT 101 to respond appropriately to the test signal 205. In this example, the DUT 101 responds by sending a response signal 206 comprised of a response data packet 206a back to the tester 102 (alternatively, a sequence of multiple data packets may be returned in response). Each data packet 205a sent by the tester 102 is answered by such response packet 206a (or sequence of multiple data packets) from the DUT 101. Hence, multiple response packets sent by the DUT 101 will necessarily be separated in time by an equal number of data packets sent by the tester 102. In other words, under good testing environment conditions (e.g., adequate signal levels and low levels of noise or interference signals), for every response packet 206a received by the tester 102, a data packet 205a would have been previously sent to and received by the DUT 101. However, as will be readily understood, some packets 205a transmitted by the tester 102 may not be received or otherwise recognized by the DUT 101, in which case corresponding response packets 206a may not be transmitted in return.

Alternatively, the DUT 101 could also respond to a data packet 205a, e.g., as a command data packet to be recognized as such based upon one or more of its signal characteristics substantially unrelated to its data content, by going into receive mode (RX) and then receiving some further sequence of signals from the tester 102. Such a response is useful, for example, for conducting a packet error rate (PER) test on the DUT 101. A PER test is performed by transmitting packets to the DUT 101 and determining how many packets have been received or otherwise recognized by the DUT 101. In accordance with one embodiment, the tester 102 transmits a data packet 205a, following which, if it is received or otherwise recognized by the DUT 101, the DUT 101 transmits a data packet 206a (e.g., an acknowledgement) in response. Following receipt by the tester 102 of a certain number of responsive data packets 206a, the tester can compare the number of response data packets 206a to the number of test data packets 205a to determine the PER of the DUT 101. In accordance with another embodiment, the tester 102 transmits a predetermined number of data packets 205a, during which the DUT 101 remains in receive mode and tallies up the received data packets 205a. Then, following a pause in reception of data packets 205a, indicating the tentative end of the test, the DUT 101 transmits a data packet 206a (e.g., an acknowledgement) in response if the predetermined number of data packets 205a have been received. If such predetermined number of data packets 205a have not been received, the DUT 101 remains silent, following which, after a predetermined interval, the tester 102 can resume transmission of data packets 206a, pausing after each one to allow the DUT 101 to reply with a data packet 206a indicating reception of the designated total number of data packets 205a, or alternatively, repeat the test in its entirety. As a further alternative, if the predetermined number of data packets 205a have not been received by the DUT 101, e.g., due to a lost signal condition for one or more data packets, the tester 102 continues transmission of data packets 206a until such data packets 205a are received, following which the DUT 101 replies in response with a data packet 206a indicating successful reception. Other possible responses will be readily apparent to one of ordinary skill in the art.

As used herein, establishing and communicating via a communication channel includes use of wired or wireless connections, as well as use of multiple frequencies, data rates, signal modulation types, signal power levels, data packet lengths, or other signal characteristics compatible with the wireless signal specification being tested. For example, the DUT 101 can recognize a data packet 205a from the tester 102 as a command to receive incoming tester signals on one frequency F1 and transmit DUT response signals on another frequency F2, thereby enabling exchanges of test 205 and response 206 signals via multiple frequencies F1, F2. As another example, the DUT 101 and tester 102 can communicate via a first frequency F1 for a number P1 of packets, and then switch to and communicate via a second frequency F2 for a number P2 of packets, and so on for additional frequencies Fn and numbers Pn of packets (such numbers Pn of packets can be though need not be equal). As another example, the DUT 101 can receive incoming tester signals on a rotating series of frequencies F1a, F1b, F1c, . . . , and transmit DUT response signals on another rotating series of frequencies F2a, F2b, F2c, . . . , with frequency switching after predetermined numbers P1a, P1b, P1c, . . . of packets or in response to a data packet 205a from the tester 102 as a command for the DUT to change its receive frequency, transmit frequency or both. Further potential combinations and permutations of frequencies will be readily apparent to one of ordinary skill in the art.

An advantage of the present embodiment of the invention is that the entire test flow is composed one signal at a time during the test itself. In other words, it is unnecessary to pre-define a test. As the DUT 101 responds entirely based on the individual data packets (such as packet 205a) received from the tester 102, it is possible to select both the particular test signals to be used and their order while conducting the test. This allows for a customizable test flow and reduces the overhead required to set up different tests, as multiple tests can be run on a single DUT 101 using the same firmware 203. Additionally, this allows for a quick response to issues encountered during testing. For example, if a DUT 101 fails to respond appropriately to a particular test signal, the test signal could be resent. Alternatively, a different test signal that tests the same functionality could be used.

However, as can be seen by the above example, this embodiment of the present invention requires that a substantial amount of time during testing be spent on control communications between the tester 102 and the DUT 101. As these control signals 205 have no inherent test value (that is, they are not themselves being used to test any functionality of the DUT 101), it is preferable to minimize the amount of time spent transmitting them during testing.

Figure 3:
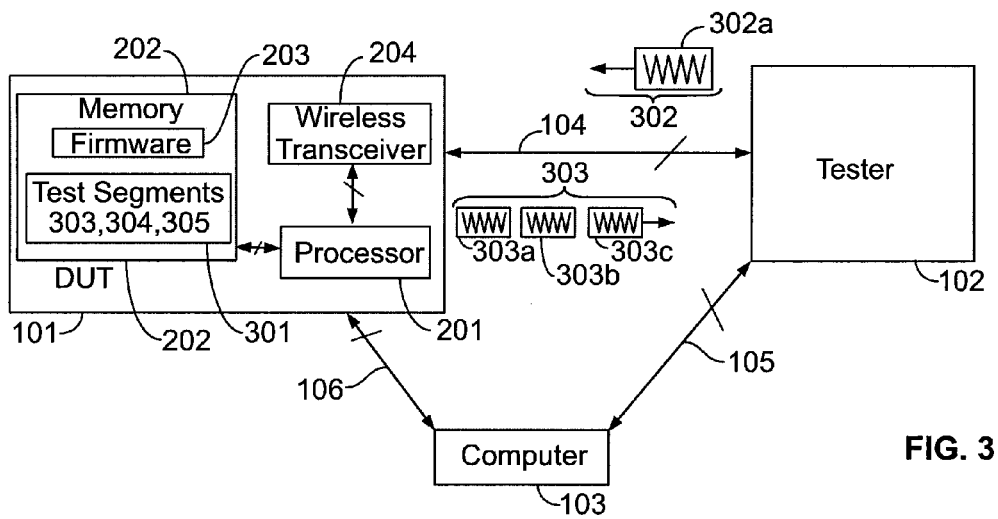
FIG. 3 is a functional block diagram depicting a system for testing a packet data signal transceiver in accordance with another embodiment of the presently claimed invention in which the firmware contained in the DUT is operative to recognize signal characteristics of tester sent signals and respond with predefined test segments.

Referring to FIG. 3, one embodiment of the present invention that serves to reduce the number of control signals required during testing is shown. The test system is configured such that a set of test segments 301 comprised of individual test segments 303, 304 and 305 is loaded into the memory 202. Although the set of test segments 301 in the present example is comprised of only three test segments, it will be readily apparent that any number of test segments can be used. To begin a test, the tester 102 sends a test signal 302 to the DUT 101. The test signal 302 can optionally be comprised of one or more data packets 302a, with particular signal characteristics. The firmware 203 within the DUT 101 is operative to recognize these particular signal characteristics as a reference to one of the set of test segments 301. As the DUT 101 only has to identify the signal characteristics of the data packet 302a received from the tester 102, rather than interpreting an entire data packet or specific data content of the data packet, it is not necessary to send a packet having specific data content. So long as the signal 302 contains a data packet 302a with sufficient signal strength and duration for the DUT 101 to correctly recognize its particular signal characteristics, the firmware 203 can respond in the appropriate manner. As way of example but not limitation, such signal characteristics could include the data rate, data channel frequency, signal modulation type, signal power level, data packet length or any other suitable signal characteristics of the data packet 302a. Other possible signal characteristics will be easily recognized by one of ordinary skill in the art.

Referring again to FIG. 3, in this particular example, the data packet 302a is sent at one particular data rate. The packet 302a has the minimum duration sufficient for the DUT 101 to identify the data rate of the packet 302a. The firmware 203 used by the processor 201 contains a reference between the data rate of such data packet 302a and one of the set of test segments 301 stored in the driver 201, specifically to test segment 303 (comprised of response packets 303a, 303b and 303c). As such, the DUT 101 responds to the data packet 302a by transmitting response packets 303a, 303b, 303c.

An advantage inherent to this embodiment of the present invention is that the number of control signals required to execute a particular test is reduced without sacrificing the ability to create custom test flows during testing (as explained above with reference to FIG. 2). By way of example, a single data packet 302a could elicit one hundred packets, or other more complex sequences of packets, in response from the DUT 101. Running this same test using the system shown in FIG. 2 would require the tester 102 to send one hundred complete packets to the DUT 101. However, as a test segment can be comprised of any number of response packets, a flexible degree of customization during testing is provided. As an example, if the DUT 101 fails to respond properly to a portion of a test designed to test a particular aspect of wireless functionality, it is possible to immediately re-run only that segment of the test. Similarly, a different test segment designed to test the same aspect could be used. In this way, testing becomes highly adaptable to unforeseen circumstances without the added cost of preparing a new or revised test flow and setting up the DUT 101 again or the need to transmit a large number of control signals. For example, if initial test results are uniformly good, it can be decided to terminate testing earlier than perhaps initially intended. Conversely, if initial test results are uniformly bad or marginal, additional testing beyond that initially intended can be performed to determine whether DUT 101 performance is marginally good or marginally bad.

Another example of a method of loading test sequences onto a driver preceding a test is disclosed in U.S. Pat. No. 7,689,213 entitled "Method For Testing Embedded Wireless Transceiver With Minimal Interaction Between Wireless Transceiver and Host Processor During Testing", the disclosure of which is incorporated herein by reference.

Figure 4:
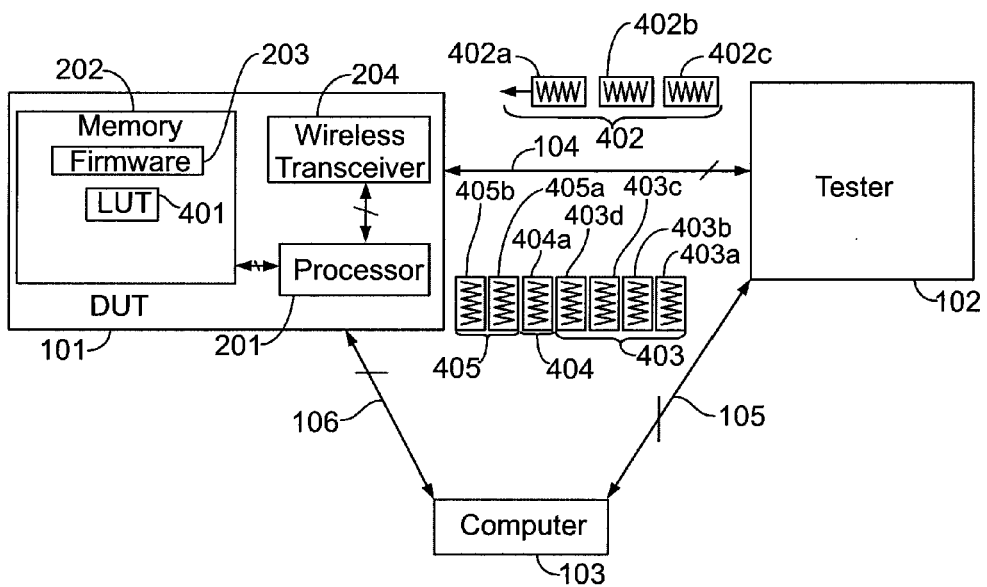
FIG. 4 is a functional block diagram depicting a system for testing a packet data signal transceiver in accordance with another embodiment of the presently claimed invention in which the test segments stored within the firmware are organized in a look-up table (LUT) and whereby particular signal characteristics of tester-sent signals are interpreted as indices to LUT data.

Referring to FIG. 4, in accordance with a preferred embodiment, a portion of the firmware 203 within the DUT 101 is organized into a look-up-table (LUT) 401. A particular signal characteristic of each packet or packet fragment in test signal 402 sent by the tester 102 is recognized as an index to the LUT 401. The tester 102, for example, sends a packet 402a with a particular data rate which the firmware 203 recognizes as an index to the LUT 401. As a result, the processor 201 follows the instructions contained by the particular row of the LUT 401 indexed by the packet 402a, causing the DUT 101 to respond, e.g., by transmitting multiple response packets 403a, 403b, 403c, 403d. The tester 102 then sends a packet 402b with a different data rate which is also recognized by the firmware 203 as an index to the LUT 401. This causes the DUT 101 to respond again, e.g., with a single packet 404a. The tester 102 sends a third packet 402c with some other particular signal characteristic, which is again recognized as an index into the LUT 401, to which the DUT 401 again responds, e.g., with multiple packets 405a, 405b.

In arranging the test segments within the firmware 203 in this manner, the tester 102 can potentially send different sequences or numbers of packets corresponding to different indices in the LUT 402. This enables the creation of customized test flows during testing that are composed of test segments stored inside the LUT 401 (e.g. the sequence of packets 403a, 403b, 403c, 403d, 404a, 405a, and 405b). In addition to these transmitted responses, the LUT 401 might have a response to a tester signal 402 that puts the DUT 101 in RX mode whereby the DUT 101 expects to receive a sequence of packets transmitted by the tester 102 (as explained above with reference to FIG. 2). The present embodiment of the invention both shortens the duration and reduces the number of tester-sent signals, thereby significantly decreasing the time required to complete a test. Flexibility in designing a test flow is also increased, as the LUT 401 can contain various levels of test segment granularity to enable the creation of a wider variety of complete test sequences during testing.

Figure 5:
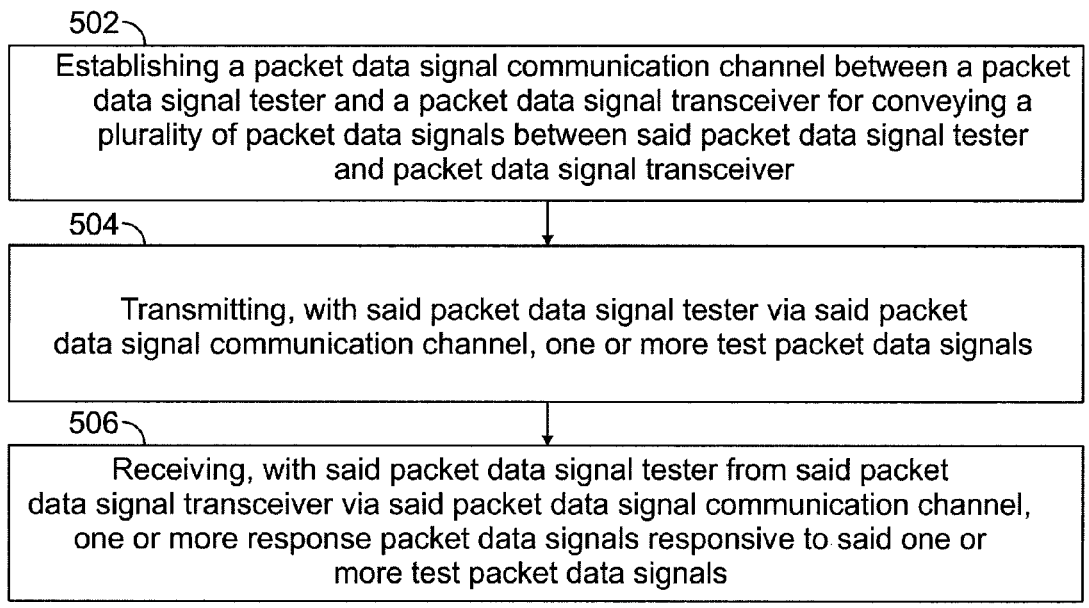
FIG. 5 is a flow chart depicting a method of testing a packet data signal transceiver in accordance with one embodiment of the presently claimed invention.

Referring to FIG. 5, a method 500 of testing a packet data signal transceiver in accordance with one embodiment of the presently claimed invention begins by establishing 502 a packet data signal communication channel between the packet data signal tester and packet data signal transceiver for conveying packet data signals between the packet data signal tester and packet data signal transceiver. This is followed by transmitting 504, with the packet data signal tester via the packet data signal communication channel, one or more test packet data signals. Responsive to this is receiving 506, with the packet data signal tester from the packet data signal transceiver via the packet data signal communication channel, one or more response packet data signals responsive to the one or more test packet data signals.

Figure 6:
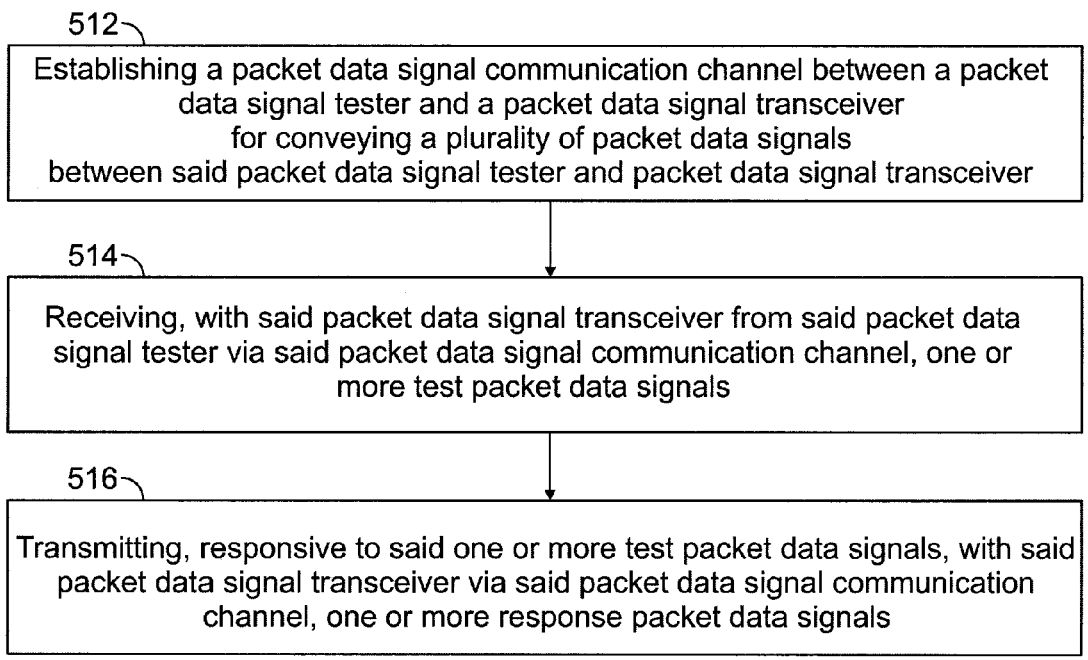
FIG. 6 is a flow chart depicting a method of testing a packet data signal transceiver in accordance with another embodiment of the presently claimed invention.

Referring to FIG. 6, a method 510 of testing a packet data signal transceiver in accordance with another embodiment of the presently claimed invention includes establishing 512 a packet data signal communication channel between a packet data signal tester and a packet data signal transceiver for conveying packet data signals between the packet data signal tester and packet data signal transceiver. This is followed by receiving 514, with the packet data signal transceiver from the packet data signal tester via the packet data signal communication channel, one or more test packet data signals. Responsive to this is transmitting 516, responsive to the one or more test packet data signals, with the packet data signal transceiver via the packet data signal communication channel, one or more response packet data signals.

Various other modifications and alternations in the structure and method of operation of this invention will be apparent to those skilled in the art without departing from the scope and the spirit of the invention. Although the invention has been described in connection with specific preferred embodiments, it should be understood that the invention as claimed should not be unduly limited to such specific embodiments. It is intended that the following claims define the scope of the present invention and that structures and methods within the scope of these claims and their equivalents be covered thereby.

What is claimed is:

1. A method of testing a packet data signal transceiver via its packet data signal interface, comprising:

establishing a packet data signal communication channel between a packet data signal tester and a packet data signal transceiver for conveying a plurality of packet data signals between said packet data signal tester and packet data signal transceiver;

transmitting, with said packet data signal tester via said packet data signal communication channel, one or more test packet data signals, wherein said one or more test packet data signals have one or more respective pluralities of packet data signal characteristics; and receiving, with said packet data signal tester from said packet data signal transceiver via said packet data signal communication channel, one or more response packet data signals responsive to said one or more respective pluralities of packet data signal characteristics, other than and without interpreting packet data signal content, of said one or more test packet data signals, wherein said one or more test packet data signals and said one or more response packet data signals contain mutually distinct packet data signal content.

2. The method of claim 1, wherein said establishing a packet data signal communication channel between a packet data signal tester and a packet data signal transceiver comprises synchronizing said packet data signal tester and packet data signal transceiver.

3. The method of claim 1, wherein said establishing a packet data signal communication channel between a packet data signal tester and a packet data signal transceiver comprises:

synchronizing said packet data signal tester and packet data signal transceiver; and transmitting, with said packet data signal tester via said packet data signal communication channel, one or more command packet data signals related to said one or more test packet data signals and said one or more response packet data signals.

4. The method of claim 1, wherein said one or more respective pluralities of packet data signal characteristics include one or more of data rate, data channel frequency, signal modulation type, signal power level and data packet length.

5. The method of claim 1, wherein:

said transmitting, with said packet data signal tester via said packet data signal communication channel, one or more test packet data signals comprises transmitting a test packet data signal; and receiving, with said packet data signal tester from said packet data signal transceiver via said packet data signal communication channel, one or more response packet data signals responsive to said one or more test packet data signals comprises receiving a response packet data signal responsive to said test packet data signal.

6. The method of claim 1, wherein:

said transmitting, with said packet data signal tester via said packet data signal communication channel, one or more test packet data signals comprises transmitting a test packet data signal; and receiving, with said packet data signal tester from said packet data signal transceiver via said packet data signal communication channel, one or more response packet data signals responsive to said one or more test packet data signals comprises receiving a plurality of response packet data signals responsive to said test packet data signal.

7. The method of claim 1, wherein:

said transmitting, with said packet data signal tester via said packet data signal communication channel, one or more test packet data signals comprises transmitting a plurality of test packet data signals; and receiving, with said packet data signal tester from said packet data signal transceiver via said packet data signal communication channel, one or more response packet data signals responsive to said one or more test packet data signals comprises receiving a response packet data signal responsive to said plurality of test packet data signals.

8. The method of claim 1, wherein:
said transmitting, with said packet data signal tester via said packet data signal communication channel, one or more test packet data signals comprises transmitting a plurality of test packet data signals; and
receiving, with said packet data signal tester from said packet data signal transceiver via said packet data signal communication channel, one or more response packet data signals responsive to said one or more test packet data signals comprises receiving a plurality of response packet data signals responsive to said plurality of test packet data signals.

9. The method of claim 1, wherein:
said transmitting, with said packet data signal tester via said packet data signal communication channel, one or more test packet data signals comprises transmitting said one or more test packet data signals via a first one or more signal frequencies; and
receiving, with said packet data signal tester from said packet data signal transceiver via said packet data signal communication channel, one or more response packet data signals responsive to said one or more test packet data signals comprises receiving said one or more response packet data signals via a second one or more signal frequencies.

10. The method of claim 1, further comprising storing, in said packet data signal transceiver, a plurality of data indicative of each one of said one or more response packet data signals to be transmitted, with said packet data signal transceiver via said packet data signal communication channel, responsive to a corresponding one or more of said one or more test packet data signals.

11. The method of claim 1, further comprising storing, in said packet data signal transceiver, a plurality of data as a plurality of indices in a lookup table indicative of each one of said one or more response packet data signals to be transmitted, with said packet data signal transceiver via said packet data signal communication channel, responsive to a corresponding one or more of said one or more test packet data signals.

12. A method of testing a packet data signal transceiver via its packet data signal interface, comprising:
establishing a packet data signal communication channel between a packet data signal tester and a packet data signal transceiver for conveying a plurality of packet data signals between said packet data signal tester and packet data signal transceiver;
receiving, with said packet data signal transceiver from said packet data signal tester via said packet data signal communication channel, one or more test packet data signals, wherein said one or more test packet data signals have one or more respective pluralities of packet data signal characteristics; and
transmitting, responsive to said one or more respective pluralities of packet data signal characteristics, other than and without interpreting packet data signal content, of said one or more test packet data signals, with said packet data signal transceiver via said packet data signal communication channel, one or more response packet data signals, wherein said one or more test packet data signals and said one or more response packet data signals contain mutually distinct packet data signal content.

13. The method of claim 12, wherein said establishing a packet data signal communication channel between a packet data signal tester and a packet data signal transceiver comprises synchronizing said packet data signal tester and packet data signal transceiver.

14. The method of claim 12, wherein said establishing a packet data signal communication channel between a packet data signal tester and a packet data signal transceiver comprises:
synchronizing said packet data signal tester and packet data signal transceiver; and
transmitting, with said packet data signal tester via said packet data signal communication channel, one or more command packet data signals related to said one or more test packet data signals and said one or more response packet data signals.

15. The method of claim 12, wherein said one or more respective pluralities of packet data signal characteristics include one or more of data rate, data channel frequency, signal modulation type, signal power level and data packet length.

16. The method of claim 12, wherein:
said receiving, with said packet data signal transceiver from said packet data signal tester via said packet data signal communication channel, one or more test packet data signals comprises receiving a test packet data signal; and
said transmitting, responsive to said one or more test packet data signals, with said packet data signal transceiver via said packet data signal communication channel, one or more response packet data signals comprises transmitting a response packet data signal responsive to said test packet data signal.

17. The method of claim 12, wherein:
said receiving, with said packet data signal transceiver from said packet data signal tester via said packet data signal communication channel, one or more test packet data signals comprises receiving a test packet data signal; and
said transmitting, responsive to said one or more test packet data signals, with said packet data signal transceiver via said packet data signal communication channel, one or more response packet data signals comprises transmitting a plurality of response packet data signals responsive to said test packet data signal.

18. The method of claim 12, wherein:
said receiving, with said packet data signal transceiver from said packet data signal tester via said packet data signal communication channel, one or more test packet data signals comprises receiving a plurality of test packet data signals; and
said transmitting, responsive to said one or more test packet data signals, with said packet data signal transceiver via said packet data signal communication channel, one or more response packet data signals comprises transmitting a response packet data signal responsive to said plurality of test packet data signals.

19. The method of claim 12, wherein:
said receiving, with said packet data signal transceiver from said packet data signal tester via said packet data signal communication channel, one or more test packet data signals comprises receiving a plurality of test packet data signals; and
said transmitting, responsive to said one or more test packet data signals, with said packet data signal transceiver via said packet data signal communication channel, one or more response packet data signals comprises transmitting a plurality of response packet data signals responsive to said plurality of test packet data signals.

20. The method of claim 12, wherein:

said receiving, with said packet data signal transceiver from said packet data signal tester via said packet data signal communication channel, one or more test packet data signals comprises receiving said one or more test packet data signals via a first one or more signal frequencies; and said transmitting, responsive to said one or more test packet data signals, with said packet data signal transceiver via said packet data signal communication channel, one or more response packet data signals comprises transmitting said one or more response packet data signals via a second one or more signal frequencies.

21. The method of claim 12, further comprising storing, in said packet data signal transceiver, a plurality of data indicative of each one of said one or more response packet data signals to be transmitted, with said packet data signal transceiver via said packet data signal communication channel, responsive to a corresponding one or more of said one or more test packet data signals.

22. The method of claim 12, further comprising storing, in said packet data signal transceiver, a plurality of data as a plurality of indices in a lookup table indicative of each one of said one or more response packet data signals to be transmitted, with said packet data signal transceiver via said packet data signal communication channel, responsive to a corresponding one or more of said one or more test packet data signals.

\* \* \* \* \*